(12) United States Patent
Lee et al.

(10) Patent No.: US 11,816,649 B2
(45) Date of Patent: Nov. 14, 2023

(54) METHOD AND SYSTEM FOR PROTECTING INTELLECTUAL PROPERTY RIGHTS ON DIGITAL CONTENT USING SMART PROPERTIZATION

(71) Applicant: Inje University Industry—Academic Cooperation Foundation, Gyeongsangnam-do (KR)

(72) Inventors: Nam Yong Lee, Gyeongsangnam-do (KR); Chul Soo Kim, Gyeongsangnam-do (KR); Jinhong Yang, Gyeongsangnam-do (KR)

(73) Assignee: Inje University Industry-Academic Cooperation Foundation, Gyeongsangnam-do (KR)

(*) Notice: Subject to any disclaimer, the term of this patent is extended or adjusted under 35 U.S.C. 154(b) by 200 days.

(21) Appl. No.: 16/951,406

(22) Filed: Nov. 18, 2020

(65) Prior Publication Data

US 2021/0334770 A1   Oct. 28, 2021

(30) Foreign Application Priority Data

Apr. 27, 2020 (KR) ........................ 10-2020-0050575

(51) Int. Cl.

| | | |
|---|---|---|
| G06F 21/10 | (2013.01) | |
| G06Q 50/18 | (2012.01) | |
| G06Q 20/12 | (2012.01) | |
| H04L 9/06 | (2006.01) | |
| H04L 9/32 | (2006.01) | |
| G06F 16/182 | (2019.01) | |
| H04L 9/00 | (2022.01) | |

(52) U.S. Cl.
CPC ...... *G06Q 20/1235* (2013.01); *G06F 16/1837* (2019.01); *G06F 21/105* (2013.01); *G06Q 50/184* (2013.01); *H04L 9/0618* (2013.01); *H04L 9/3263* (2013.01); *H04L 9/50* (2022.05)

(58) Field of Classification Search
CPC ............. G06Q 20/1235; G06Q 50/184; G06Q 2220/00; G06Q 20/02; G06Q 20/0658; G06F 16/1837; G06F 21/105; G06F 2221/0779; G06F 21/10; H04L 9/0618; H04L 9/3263; H04L 9/50; H04L 63/08; H04L 2209/56; H04L 9/3239; H04L 2209/603

See application file for complete search history.

(56) References Cited

U.S. PATENT DOCUMENTS

| | | | |
|---|---|---|---|
| 11,223,470 B1* | 1/2022 | Shea | ........................ G06F 21/64 |
| 2017/0099136 A1* | 4/2017 | Straub | ................... H04L 9/0819 |

(Continued)

FOREIGN PATENT DOCUMENTS

| | | | | |
|---|---|---|---|---|
| CN | 110088742 A | * | 8/2019 | ......... G06F 15/7871 |
| CN | 110505223 A | | 11/2019 | |

(Continued)

*Primary Examiner* — Neha Patel
*Assistant Examiner* — Chunling Ding
(74) *Attorney, Agent, or Firm* — Occhiuti & Rohlicek LLP

(57) ABSTRACT

Disclosed are a method and system for protecting intellectual property rights on digital content using smart propertization. The method of protecting intellectual property rights on digital content includes determining whether to decode encoded digital content based on the digital data indicative of a license for the digital content recorded on a blockchain.

13 Claims, 6 Drawing Sheets

(56) References Cited

U.S. PATENT DOCUMENTS

| | | | |
|---|---|---|---|
| 2017/0116693 A1* | 4/2017 | Rae | G06Q 50/184 |
| 2017/0302653 A1* | 10/2017 | Ortner | H04L 63/0435 |
| 2017/0337534 A1* | 11/2017 | Goeringer | H04L 63/12 |
| 2018/0183687 A1* | 6/2018 | Dementev | H04L 41/50 |
| 2018/0374173 A1 | 12/2018 | Chen et al. | |
| 2020/0007513 A1* | 1/2020 | Gleichauf | G06F 8/65 |
| 2020/0074429 A1* | 3/2020 | DeRosa-Grund | H04N 21/632 |
| 2020/0118068 A1* | 4/2020 | Turetsky | G06Q 20/02 |
| 2020/0145221 A1* | 5/2020 | Chao | H04L 63/061 |
| 2020/0304290 A1* | 9/2020 | Coulmeau | G06F 21/6245 |

FOREIGN PATENT DOCUMENTS

| | | |
|---|---|---|
| KR | 101628005 B1 | 6/2016 |
| KR | 10-2018-0112027 A | 10/2018 |
| WO | WO-2020024184 A1 * | 2/2020 |

* cited by examiner

METHOD AND SYSTEM FOR PROTECTING INTELLECTUAL PROPERTY RIGHTS ON DIGITAL CONTENT USING SMART PROPERTIZATION

CROSS REFERENCE TO RELATED APPLICATION

This application claims priority under 35 U.S.C. § 119 to Korean Patent Application No. 10-2020-0050575 filed on Apr. 27, 2020, which is incorporated herein by reference in its entirety.

BACKGROUND OF THE INVENTION

1. Technical Field

Embodiments of the present disclosure relate to a method and system for protecting intellectual property rights on digital content using blockchain-based smart propertization.

2. Description of the Related Art

Digital content can be easily distributed duplicated and also does not experience the degradation of performance in its process. The characteristics of such digital content increase the needs for the illegal duplication of the digital content and also have many difficulties in applying a technology for protecting intellectual property rights.

For the protection of intellectual property rights on digital content, many digital rights management methods have been suggested, but are all insufficient to protect damage to the illegal duplication of the digital content in a current situation. In general, if a strong digital rights management technology is applied, it may help to protect intellectual property rights, but increases users' inconvenience to degrade a margin of digital content. If a digital rights management technology that is not technically perfect is applied, a margin of digital content tends to be decreased because the possibility that illegal duplicated digital content will emerge is increased.

One of problems related to the existing digital rights management technology for digital content is that in general, the subject that applies the digital rights management technology is an intermediate seller who distributes the digital content. Specifically, the inequality of distribution is increased because a profit given to a digital content producer and a user is small, compared to a compensation for applying the digital rights management technology and a profit given to an intermediate seller with respect to the distribution of digital content. For example, an intermediate seller requests a significant portion of a margin for digital content in return for a digital rights management technology and a selling channel provided to the producer of the digital content (e.g., about 40% in the case of the music market). Furthermore, the intermediate seller constructs its own digital content business ecosystem in a process of providing the digital rights management technology and the purchase channel to users, and uses a strategy that binds the users to the business ecosystem. This collides against users' profits, such as that the users' selection is limited (e.g., limits the users' selection to a limited music consumption form using streaming service and a monthly fixed payment method).

Characteristics of a modern password lie in that a cryptographic function E itself that encodes given plain text "m" uses a known method and a cryptographic function generates a different cryptogram "c" based on a secret key K. The cryptogram "c" is the same as Equation 1.

$$c=E(K,m) \quad (1)$$

In the case of most of modern passwords, a decoding function D for calculating the plain text "m" by decoding the cryptogram "c" has the same structure as a cryptographic function E. In the decoding process, a case where decoding is performed using the same secret key K is called a symmetric key password. The process of decoding the symmetric key password is represented like Equation 2.

$$m=D(K,c) \quad (2)$$

FIG. 1 is a diagram illustrating the decoding process of Equation 2. "c" means encoded digital content, and "m" means decoded digital content.

Unlike in the symmetric key password, in a public key password (a function that performs the public key password is assumed to be G), a public key "e" (called a public key) used in an encoding process is different from a key "d" (called a private key) used in a decoding process. Specifically, although the public key "e" is known, the public key password is designed so that a corresponding private key "d" cannot be practically calculated. Based on such a property, the public key "e" used for a password is made public so that anyone can calculate his or her desired plain text "m" using the cryptogram "c." In contrast, a public key password may be configured so that the cryptogram "c" can be decoded by only the owner of the private key "d" corresponding to the public key "e."

A process of encoding, into the cryptogram "c", the plain text "m" using the public key "e" is represented like Equation 3. A process of decoding, into the plain text "m", the cryptogram "c" using the private key "d" is represented like Equation 4.

$$c=G(e,m) \quad (3)$$

$$m=G(d,c) \quad (4)$$

In the case of the public key, both encoding and decoding processes are represented as G. The reason for this is that the encoding and decoding processes can be distinguished using the public key and the private key.

A basic frame of the protection of intellectual property rights on digital content using a symmetric key password has a form in which a producer sets a state of c in which digital content "m" is encoded using a secret key K and provides a user with the secret key K capable of decoding the digital content m in a hidden state. In this case, the reason why the secret key K needs to be provided to the user in the hidden state is that if the user can use the decoding key K as much as the user wants, the user may calculate the decoded digital content "m" and then duplicate and illegally distribute the calculated digital content "m".

A process of decoding, into the original digital content "m", c by which the secret key K has been encoded by a decoding function D in the hidden state ($D_K$ in Equation 5) is represented like Equation 5.

$$m=D_K(c) \quad (5)$$

FIG. 2 is a diagram illustrating the decoding process of Equation 5. c means encoded digital content, and m means decoded digital content.

Various methods may be used to hide the secret key in the decoding function. For example, various methods, such as code obfuscation, a method of changing and calculating specific calculation into a lookup table whose sequence is randomly changed, and a method of using an additional secret key may be applied.

The public key password proves that the owner of the private key "d" can own the private key "d" in the state in which the owner has not disclosed the private key "d" using the challenge-response protocol, and a detailed procedure thereof is the same as Equation 6.

$$A \rightarrow B: c_0$$

$$B \rightarrow A: r, c_1 (r = (G(d, c_0 \star c_1))$$

$$A: \text{Verify } G(e,r) = c_0 \star c_1 \qquad (6)$$

In Equation 6, B means the owner of the private key "d", and A means a person who requests corresponding proof. Furthermore, ★ means that two bit strings are combined using a predetermined method. A detailed method thereof is determined by the property of a public key password function G.

In Equation 6, the first step is a "challenge" step for requesting, by A, a response using d for $c_0$ from B.

In Equation 6, the second step is a "response" step for generating, by B, a random number called $c_1$, combining (represented as ★) the random number and $c_0$ transmitted thereto, calculating a password using its own private key "d", and transmitting a result r and $c_0$ to A. In this process, the reason why B calculates the password using its own private key "d" with respect to $c_0 \star c_1$ combined with the random number $c_1$ that is generated by itself not $c_0$ is for preventing a danger of its own private key "d" being exposed due to a homogeneity property for a specific operation of some public keys.

In Equation 6, the last step is a step for confirming, by A, whether a response "r" of B is modify using the public key "e" of B. That is, B proves that it is the owner of d by making A confirm $G(e, r) = c_0 \star c_1$. It is to be noted that in a series of the processes, B has not disclosed its private key "d."

SUMMARY OF THE INVENTION

Embodiments provide a technology which enables digital content producers to protect intellectual property rights on their digital content.

Embodiments provide an environment in which inconvenience caused by technologies applied to users for the protection of intellectual property rights can be minimized and the right of using purchased digital content can be freely exerted.

Embodiments provide a technology which enables digital content producers and users to directly conduct transactions by substituting, with a decentralized digital content distribution ecosystem, the role of intermediate sellers that connect the digital content producers and the users.

In an aspect, a method of protecting intellectual property rights on digital content is executed in a computer system, and includes at least one processor configured to execute computer-readable instructions included in a memory. The method is executed by the at least one processor, and includes determining whether to decode encoded digital content based on the digital data indicative of a license for the digital content recorded on a blockchain.

According to an aspect, determining whether to decode encoded digital content includes controlling the license using a multi-blockchain structure, including a mainchain for providing blockchain network participants with sequence information on contents registered with the blockchain, an accountchain including information necessary to manage the license, and multiple sidechains composed of segments whose starts and ends are connected to the mainchain and registering a process of generating, transferring and discarding the license. Each of the mainchain and the sidechain has an unmodifiable structure. The accountchain has a modifiable structure.

According to another aspect, controlling the license may include disclosing a sequence relation between blocks of the sidechain and a task to be performed in each step to the blockchain network participants using the mainchain.

According to still another aspect, controlling the license may include generating an account for managing the digital content, and applying a modifiable blockchain structure to the accountchain having a connection of blocks of accounts so that a generation, transferral or discard of the license is able to be registered with the generated account.

According to still another aspect, controlling the license may include registering a request for generating, transferring or discarding the license with a segment of a dual sidechain in which the sidechains connected to the mainchain are present in pairs, and registering a modification command for modifying an account with a next dual sidechain in response to the request for generating, transferring or discarding the license.

According to still another aspect, the method may further include using cryptocurrency as a transaction price for a generation or transferral of the license.

According to still another aspect, determining whether to decode encoded digital content may include performing the decoding of the digital content based on a given condition because the digital content, a decoding function in which a secret key is hidden, and an immobilizer controlling the decoding are combined in an inseparable form.

According to still another aspect, determining whether to decode encoded digital content may include performing the decoding of the digital content using a management program for managing a private key corresponding to a registration key used to manage the license.

According to still another aspect, the method may further include generating multiple pieces of the encoded digital content from one piece of digital content using a randomly selected secret key.

According to still another aspect, the method may further include protecting personal information related to a consumption of the digital content by assigning the license to a randomly selected registration key.

According to still another aspect, the method may further include setting a period in which the digital content is used by modifying an account in which the license is managed.

According to still another aspect, the method may further include determining a user condition on the digital content by modifying an account in which the license is managed, and determining the number of pieces of the available digital content based on the determined condition.

According to still another aspect, the method may further include discarding a license assigned to a registration key used for an illegal use of the license.

According to still another aspect, the method may further include modifying the account in response to a change in the generation, transferral or discard of the license. Modifying the account may include registering a change request for the license with a segment of the sidechain, classifying a change in the license, registered with a previous sidechain segment, for each account, writing a modification command for the account and registering the modification command with a dual sidechain block, and performing the modification command when the dual sidechain segment is connected to the mainchain.

In an aspect, a computer system includes at least one processor configured to execute computer-readable instructions included in a memory. The at least one processor determines whether to decode encoded digital content based on the digital data indicative of a license for the digital content recorded on a blockchain, and determines whether to decode encoded digital content may include controlling the license using a multi-blockchain structure, including a mainchain for providing blockchain network participants with sequence information on contents registered with the blockchain, an accountchain including information necessary to manage the license, and multiple sidechains composed of segments whose starts and ends are connected to the mainchain and registering a process of generating, transferring and discarding the license. Each of the mainchain and the sidechain has an unmodifiable structure. The accountchain has a modifiable structure.

DETAILED DESCRIPTION

Figure 1:
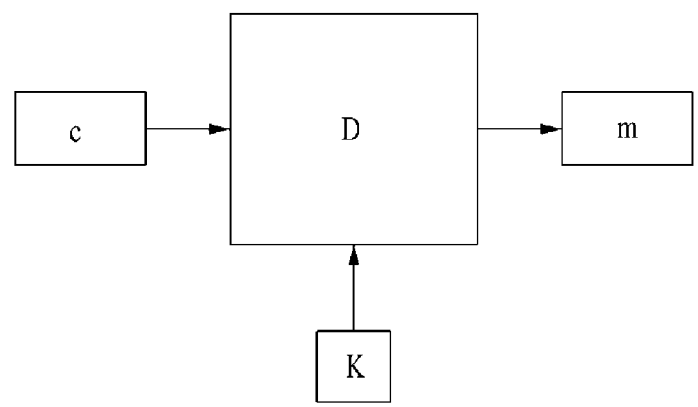
FIG. 1 is a diagram illustrating a decoding process in which a secret key K is provided from the outside of a decoding function D.
Figure 2:
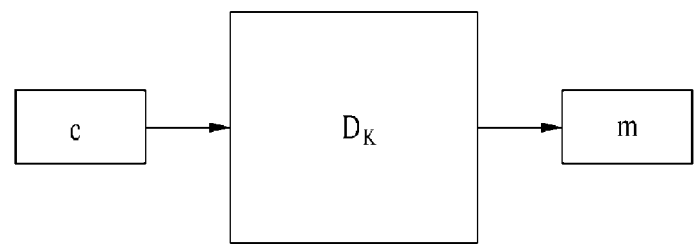
FIG. 2 is a diagram illustrating a decoding process in which the secret key K uses a hidden decoding function $D_K$.

Hereinafter, embodiments of the present disclosure are described in detail with reference to the accompanying drawings.

A method and system for protecting intellectual property rights on digital content using smart propertization according to embodiments of the present disclosure relate to a decentralized digital content intellectual property rights management system for managing smart propertization of digital content and the generation, transferral and discard of a license (i.e., digital data including contents that the use of smart-propertized digital content is permitted for a specific user) for digital content using a multi-blockchain system according to an embodiment of the present disclosure and protecting intellectual property rights on digital content so that smart-propertized digital content can be played back using only the managed license.

The present embodiments provide a technology that enables digital content producers to protect intellectual property rights on their digital content, and provide a technology that enables users who have purchased a license for digital content (i.e., digital data including contents that a specific user is permitted to use smart-propertized digital content) to freely exert the right of using the license (e.g., the free use of digital content or the transferral of the license in several devices).

The present embodiments provide may include the steps of constructing smart-propertized digital content by combining encoded digital content, a decoding function in which a secret key is hidden, and an immobilizer that controls decoding and a connection with the outside in an inseparable form; controlling the right of using the smart-propertized digital content using a multi-blockchain system configured with a mainchain, an accountchain, and multiple sidechains having a blockchain structure; using its own cryptocurrency which may be used for a compensation for the block mining of the multi-blockchain system and a transaction price for a license for the smart-propertized digital content; making participants of the entire multi-blockchain system clearly understand a sequence relation between the blocks of the sidechains and a task to be performed in each step using the mainchain; registering an account for managing the smart-propertized digital content with the accountchain; making the license for the smart-propertized digital content in a form in which the license can be traded on the blockchain using a public key called a registration key in order to implement the "generation" (i.e., a producer permits a user to use specific smart-propertized digital content), "transfer" (i.e., a user transfers, to another user, a license for his or her own specific smart-propertized digital content) and "discard" (i.e., a producer discards a license for specific smart-propertized digital content permitted for a user) of the license for the smart-propertized digital content; placing a "balance" in the registration key used in the step of making the license for the smart-propertized digital content in the form in which the license can be traded on the blockchain, inducing the use of the balance if a private key associated with the registration key is made public to unspecified individuals, and detecting the illegal use of the license using the balance; applying a modifiable blockchain structure in order to safely register a license set, varying in response to the generation, transferral and discard of the license, with accounts registered with the accountchain; registering a request for the generation, transferral or discard of the license for the smart-propertized digital content with a sidechain segment and registering a modification command to modify the account of the smart-propertized digital content in a dual sidechain segment of a next step; modifying the accounts for managing the smart-propertized digital content based on the modification command registered with the dual sidechain segment when the dual sidechain segment is connected to the mainchain; using a "management program" for managing private keys corresponding to registration keys used to manage the license for the smart-propertized digital content; managing, by the management program of a user, cryptocurrency private keys of the multi-blockchain system of the user and managing the transactions of the license for the smart-propertized digital content; registering a "timestamping" request with the mainchain so that the management program of the smart-propertized digital content can check the progress of all of multiple blockchains; managing, by the management program of the user, the license for the smart-propertized digital content of the user; providing, by the management program of the user, "user authentication" (i.e., confirm whether a user has a private key corresponding to a registration key used when the playback of content is requested) and a "license set" (i.e., information indicating to which registration key has a license for corresponding smart-propertized digital content been given) in response to a request from an immobilizer embedded in the smart-propertized digital content; forcing regular updates of a license set for the smart-propertized digital content and irregular updates based on the generation or transfer of the license through only the entire multi-blockchain system using the management program; and requesting, from the management program, information necessary for the process of confirming, by the immobilizer embedded in the smart-propertized digital content, the license for the smart-propertized digital content and stopping the playback of the smart-propertized digital content if a response to the request is not provided within a predetermined time.

General Structure and Symbols

A blockchain model proposed in an embodiment of the present invention is a multi-blockchain, and partially has an unmodifiable structure like the Bit Coin blockchain but partially has a modifiable structure.

The multi-blockchain system according to an embodiment of the present disclosure includes a blockchain to be called a mainchain having an unmodifiable structure. The blocks of the mainchain provide all of blockchain network participants with sequence information for contents registered with the blockchain, determines which task needs to be performed in a current situation, and records a timestamping request, etc.

The multi-blockchain system according to an embodiment of the present disclosure includes a blockchain to be called a sidechain. A plurality of the sidechains is present. Each of the sidechains is used for a predetermined object. The sidechain has an unmodifiable structure and is composed of segments whose starts and ends are connected to the mainchain. The start and end of each of the segments are determined by a block hash value of the mainchain. For example, the segment of which sidechain will be terminated and a new segment will be started may be determined based on a bit string in an end figure in a predetermined length of the block hash value of the mainchain.

The multi-blockchain system according to an embodiment of the present disclosure includes a blockchain to be called an accountchain and having a modifiable structure. The blocks of the accountchain is composed of accounts for handling information necessary to manage a license for digital content using smart propertization.

In this specification, the contents of the present disclosure are described using a public blockchain as an embodiment. In view of the contents of the present disclosure, it is evident that an embodiment of the present disclosure may also be applied to blockchains having private and consortium forms.

It is assumed that cryptocurrency managed by the multi-blockchain system itself is used for the multi-blockchain system according to an embodiment of the present disclosure for a compensation for block mining. It is also assumed that one of cryptocurrency managed by the multi-blockchain system itself, separate and independent cryptocurrency, or actual flat money is used for the payment of transactions of the right of using digital content. In this specification, an example in which cryptocurrency managed by the multi-blockchain system itself is used for the payment of transactions of the right of using digital content will be described as an embodiment.

In an embodiment of the present invention, it is assumed that the following participants are present.

TABLE 1

| Symbol | Contents |
| --- | --- |
| P | Producer of digital content: a sole participant capable of accessing digital content to which encoding has not been applied. Perform smart propertization of digital content |

TABLE 1-continued

| Symbol | Contents |
| --- | --- |
| U | User of digital content |
| D | Administrator of digital content: manage smart-propertized digital content to be downloaded by users in response to a request from P. Can perform business, such as simple storage to advertising of digital content, and the generation and management of a license, by proxy |

Smart Propertization of Digital Content

In the present embodiment, the following symbols will be used to describe a smart propertization process of digital content and a method of protecting intellectual property rights using the smart propertization process.

TABLE 2

| Symbol | Contents |
| --- | --- |
| m | Digital content |
| K | Secret key used for the encoding of m |
| c | Results of encoding of m using the secret key K |
| $D_K$ | Decoding function in which the secret key K is hidden, $m = D_K(c)$ |
| s | Smart propertized digital content |
| $id_s$ | Identification number of s |
| IM | Immobilizer of s |
| MP | Management program for smart-propertized digital content |
| $pk_{MP}$ | Registration key (public key) of MP |
| $sk_{MP}$ | Authentication key (private key) of MP corresponding to $pk_{MP}$. Hidden in MP |
| $MP_U$ | Management program MP installed in the devices of a user U |
| $pk_{MPU}$ | Registration key (public key) of $MP_U$ generated when MP is installed in the device of the user U |
| $sk_{MPU}$ | Authentication key (private key) of $MP_U$ corresponding to $pk_{MPU}$. Hidden in $MP_U$ |
| $S_{MPU}$ | Results of modification of s so that it can be managed by $MP_U$. $s_{MPU} = (s, pk_{MPU})$ |

In an embodiment of the present disclosure, smart-propertized digital content is designed to be accessible to only a program that operates while observing "agreed rules" (detailed descriptions thereof will sequentially appear in this specification. The produced program is called a "management program" in an embodiment of the present invention. The management program or the producer of the program is indicated as MP.

The producer of the management program MP has the MP verified by a producer association or an agency institute thereof that the MP has been designed to operate while observing the "agreed rules", and generates the registration key $pk_{MP}$ of the management program MP. The registration key $pk_{MP}$ is randomly generated as a public key of a public key password system, and is used to confirm whether smart-propertized digital content is managed by the management program operating while observing the "agreed rules." The authentication key $sk_{MP}$ of MP corresponding to $pk_{MP}$ needs to be hidden in the management program MP as a private key corresponding to the public key $pk_{MP}$ of the public key password system. To hide the authentication key $sk_{MP}$ hidden in the management program MP so that the authentication key $sk_{MP}$ cannot be extracted is one of the "agreed rules."

The management program itself needs to be different for each user, but all of management programs installed in several devices belonging to the same user are the same. By considering this point, a management program installed in the device of a user U by the user is indicated as $MP_U$. In an embodiment of the present invention, a user may install and use the management program in a limited number of several devices, but is prevented from using the management program in the limited number of several devices at the same time.

In an embodiment of the present invention, the first step of "smart propertization" of the digital content m is performed through a process of Equation 7.

(a) $P:m,K \rightarrow c=E(K,m)$ (b) $P:K,r_1 \rightarrow D_K$ (c) $P:id_s,r_2 \rightarrow IM$ (d) $P:c,D_K,IM,pk_{MP},r_3 \rightarrow s$  (7)

In Equation 7, P is a sole participant capable of accessing m in the state in which m has not been encoded as the producer of the digital content "m." c is the results of encoding of m. $id_s$ is the identification number of smart-propertized digital content s, and is previously determined by P before s is generated.

In Equation 7(a), the producer P encodes the digital content m into c using a randomly selected secret key K.

In Equation 7(b), the producer P generates a decoding function $D_K$ in which the secret key K is hidden using a random number $r_1$. In this process, the random number $r_1$ is used to add code obfuscation or arbitrariness necessary to apply a randomized lookup table in a process of generating the decoding function $D_K$ in which the secret key K is hidden.

In Equation 7(c), the producer P generates an program IM to be called an immobilizer using the identification number $id_s$ of s and the random number $r_2$. The immobilizer IM may confirm with which smart-propertized digital content s it has to be using $id_s$ hidden therein. The random number $r_2$ hides $id_s$, and is used for arbitrariness added to make the IM robust against reverse engineering analysis.

In Equation 7(d), the producer P generates "s" in which the encoded digital content c, the decoding function $D_K$ in which the secret key is hidden, the immobilizer IM, and the registration key $pk_{MP}$ of the management program MP are combined in an inseparable form using the random number $r_3$. "s" will be named "smart-propertized digital content." The random number $r_3$ is used for arbitrariness added in a process of combining digital content c encoded from the smart-propertized digital content s, the decoding function $D_K$ in which the secret key is hidden, the immobilizer IM, and the registration key $pk_{MP}$ of MP in an inseparable form. The owner of the smart-propertized digital content s may not be the producer P. For example, multiple pieces of smart-propertized digital content s may be produced with respect to the digital content m produced by P, and may be owned by different owners. However, in this specification, for convenience of description, it will be assumed and described that the producer P is the owner of s.

A role of the immobilizer IM is to determine whether to perform or stop the decoding of c essential for the playback of s depending on whether a user has been permitted to use s and s has been managed by a registered management program, when the user tries to play back the smart-propertized digital content s.

A function that implements the process of Equation 7 is represented like Equation 8 using a smart propertization function (SPF).

$s=SPF(m,K,id_s,pk_{MP},r_1,r_2,r_3)$, $s=(c,D_K,IM,pk_{MP})$  (8)

The producer P may calculate the smart-propertized digital content s from the digital content m using the SPF.

The producer P may be managed in its own data server so users can download the smart-propertized digital content s or may request other data administrators to manage the producer P. Furthermore, the producer P may directly manage the identification number of $id_s$ of the smart-propertized digital content s or may request other data administrators to manage the identification number. In this case, attention to be paid is that the producer P in addition to the third parties from which the management has been requested does not need to keep the random numbers $r_1$, $r_2$, and $r_3$ used in Equation 7 and Equation 8 and the secret key K necessary for decoding, in order to manage the smart-propertized digital content s.

The producer P may generate multiple pieces of smart-propertized digital content using a combination of several other secret keys K and the random numbers $r_1$, $r_2$, and $r_3$ in Equation 8 with respect to one piece of the digital content m, and may distribute different smart-propertized digital content to multiple data administrators so that users can download the different smart-propertized digital content. Accordingly, a problem in that many download requests are concentrated on one server at the same time can be solved.

Furthermore, smart-propertized digital content stored in the same data administrator may be substituted with smart-propertized digital content newly generated using another secret key K and the random numbers $r_1$, $r_2$, and $r_3$. Accordingly, the number of licenses which may be generated for one piece of smart-propertized digital content can be limited to a specific number or less.

In order to use the multi-blockchain-based digital content management system according to an embodiment of the present disclosure, first, a user U is requested to perform "user registration."

In an embodiment of the present disclosure, a user uses, as a user registration key, one of public keys used in the transactions of cryptocurrency managed by the multi-blockchain system. In order for the user U to use a public key $pk_U$ as a user registration key, the user needs to prove that $pk_U$ is owned by the user (U has to prove that U owns a private key $sk_U$ (this is named an "authentication key") corresponding to the public key $pk_U$ through the challenge-response protocol). A "specific amount of cryptocurrency" must have been assigned to $pk_U$. The "specific amount of cryptocurrency" is named the "balance of $pk_U$", and an object of the balance is to detect a behavior of the user U to provide another person with the private key $sk_U$ corresponding to $pk_U$. For example, if anyone has used the balance assigned to $pk_U$, it is considered that the private key $sk_U$ corresponding to $pk_U$ has been provided to another person. As corresponding sanctions, an embodiment of the present disclosure provides a method capable of stopping the use of smart-propertized digital content which can be played back using the registration key $pk_U$ of the user U. In an embodiment of the present invention, an object of the balance assigned to the registration key is to detect cheating not punishment that gives monetary damage to cheating. For this reason, a very small amount of the balance is considered to be cheating.

In the previous paragraph, the reason why the "balance of $pk_U$" not the "balance of U" is used is that an embodiment of the present disclosure enables a user to use multiple registration keys. Accordingly, the user can protect personal information related to the consumption of its own digital content.

Each piece of smart-propertized digital content has a different immobilizer except a case where the smart-propertized digital content is generated using a combination of the same random numbers with respect to the same digital content. Accordingly, if the user U uses multiple pieces of smart-propertized digital content, there is a need for a program that will manage the multiple immobilizers M. A program designed for such an object is the aforementioned "management program" MP.

The user stores and uses, in the management program, its own registration key $pk_U$ and the authentication key $sk_U$ corresponding to the registration key. Furthermore, if the user uses cryptocurrency to purchase the right of using the smart-propertized digital content, the management program is designed to play a role of a cryptocurrency wallet of the user. This is one of reasons that the management program itself needs to be different for each user.

The management program $MP_U$ installed in the device of the user U manages a process of purchasing the right of using the smart-propertized digital content s and playing back the smart-propertized digital content s. In particular, in the process of playing back the smart-propertized digital content s, $MP_U$ is designed to provide information requested by the immobilizer IM of s.

In an embodiment of the present disclosure, when the management program $MP_U$ is installed, a registration key $pk_{MPU}$, that is, a public key of the public key password system, and an authentication key $sk_{MPU}$, that is, a corresponding private key, are randomly generated depending on the user U. Furthermore, the authentication key $sk_{MPU}$ is hidden in the management program $MP_U$. One of the aforementioned "agreed rules" is to hide the authentication key $sk_{MPU}$ of $MP_U$ hidden in the management program $MP_U$ so that the authentication key $sk_{MPU}$ cannot be extracted.

The management program $MP_U$ includes its own registration key $pk_{MPU}$ in the smart-propertized digital content s to be managed, in a form in which the registration key $pk_{MPU}$ cannot be separated or forged without using the management program $MP_U$. The results of s modified by such a method are indicated as $s_{MPU}$. In this case, since s maintains its form within $s_{MPU}$ without any change, the management program is designed so that a modification into $s_{MPU}$ never affects an operation of the immobilizer IM embedded in s.

One of the aforementioned "agreed rules" is that the management program $MP_U$ includes its own registration key $pk_{MPU}$ in s in a form in which the registration key cannot be separated or forged without using the management program $MP_U$ and is designed so that a modification itself never affects an operation of the immobilizer IM.

In an embodiment of the present disclosure, the immobilizer IM of the smart-propertized digital content s is designed to measure a lapse of time while being used. Accordingly, if a response to information requested by the immobilizer IM while s is played back is not provided within a given time, the immobilizer IM stops the decoding of c. Furthermore, the immobilizer IM stops the decoding of c with respect to a wrong response.

In an embodiment of the present disclosure, the immobilizer IM has a function for generating a random number.

Figure 3:
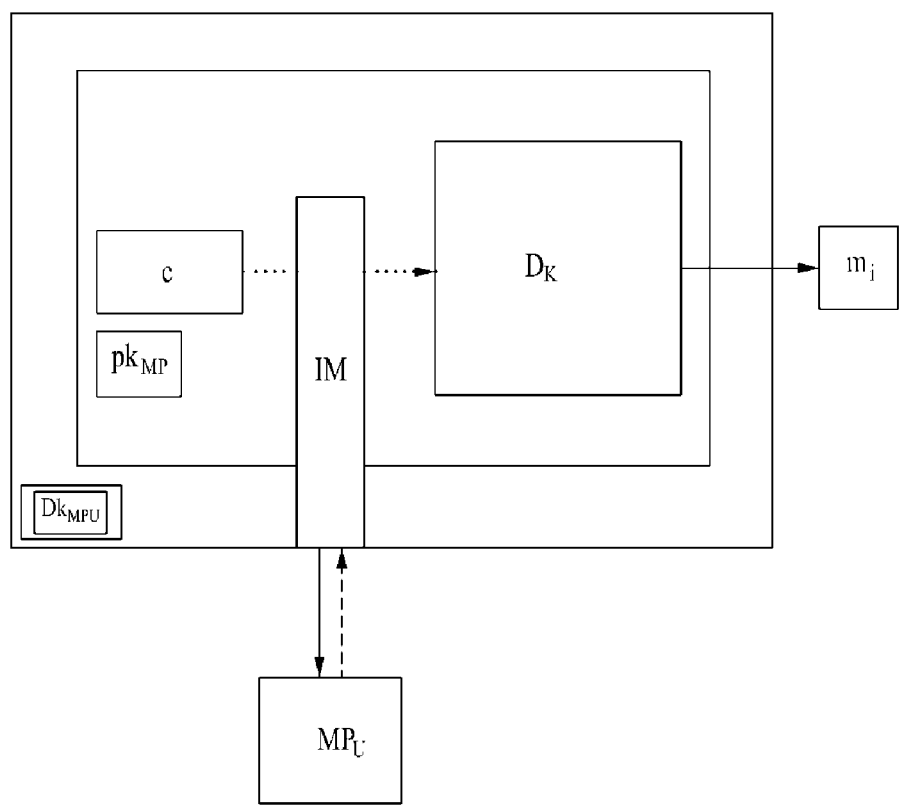
FIG. 3 illustrates a conceptual view of smart-propertized digital content according to an embodiment of the present disclosure.

FIG. 3 is a diagram illustrating a role of the immobilizer IM of the smart-propertized digital content s.

Encoded digital content c is decoded in a streaming form $(m_i)$ using the decoding function $D_K$ in which the secret key K is hidden, and the entire process thereof is controlled by the immobilizer IM. The encoded digital content c, the decoding function $D_K$ in which the secret key K is hidden, and the immobilizer IM are combined in an inseparable form. The exchange of information with an external management program $MP_U$ is monopolized by the immobilizer IM. In this case, $pk_{MP}$ is included in the smart propertization process of digital content. The immobilizer uses $pk_{MP}$ to authenticate MP using the registration key of the management program MP. $pk_{MPU}$ includes the smart-propertized digital content for the management of the management program of the user $MP_U$. The immobilizer uses $pk_{MPU}$ to authenticate $MP_U$ using the registration key of $MP_U$.

Referring to FIG. 3, the immobilizer IM determines whether to continue or stop decoding based on a result of a response to a request, while sequentially decoding($m_i$) c.

Mainchain

In an embodiment of the present disclosure, the mainchain that operates and controls the entire system and provides a timestamping function is used. The mainchain may be configured in a blockchain form having various forms. In the present embodiment, as an embodiment, contents of the present disclosure are described based on the blockchain model using the proof of work (POW) method used in Bit Coin. It is evident that the technology of the present disclosure may also be applied to other forms of proof methods (e.g., a proof of stake (POS)) in view of the contents.

It is assumed that the mainchain to be handled in the present embodiment has been designed to calculate a new block almost every predetermined time as in Bit Coin. In this case, the predetermined time is assumed to be a rotation, and the rotation is indicated as $Rd^{[n]}$, a block added in the rotation is indicated as $B^{[n]}$, and a mainchain to which the block B[n] has been added is indicated as $BC^{[n]}$ using n (n=0, 1, . . . ) indicative of the progress of a sequential rotation. In a situation in which the rotation $Rd^{[n]}$ is performed using the symbols, a mainchain owned by each main node (i.e., an individual device participating in a mainchain network, for example, the computer of a participant) may be indicated as $BC^{[n-1]}$.

The data of the block $B^{[n]}$ is configured with a bit string $a^{[n-1]}$ added by the hash value $h^{[n-1]}$ and sidechain of a previous block $B^{[n-1]}$, the number n of a current rotation, a junction p of timestamping bit strings requested by the management program $MP_U$ in the current rotation, the pointer of a hash value $h^{[n]}$ of a current block, and a nonce value $r^{[n]}$ used to calculate the hash value. Specifically, the hash value h[n] and the nonce value r[n] in the mainchain are defined as answers of Equation 9.

Proof of work (POW)-mainchain
with respect to given $h^{[n-1]}$, $a^{[n-1]}$, n, ρ, $$\text{the nonce value } r \text{ satisfying } H(h^{[n-1]}\|a^{[n-1]}\|n\|\rho\|r) \in Y_{0M}(1 \leq M \leq 256) \text{ is calculated} \quad (9)$$

In Equation 9, H is a SHA-256 hash function for generating 256 bit strings as an output with respect to any input, and means a set of bit strings configured with only 0M=M 0s and a bit string in which the first |X| bits are X, among $Y_X$=256 bit strings (|X|=the length of the bit string X). That is, $Y_{0M}$ is a set of bit strings in which all of the first M bits are 0 among the 256 bit strings.

The results (Equation 10) of the nonce value $r^{[n]}$ satisfying the hash puzzle of Equation 9 is a hash value of the block $B^{[n]}$.

$$h^{[n]} = H(h^{[n-1]}\|a^{[n-1]}\|n\|\rho\|r^{[n]}) \quad (10)$$

Contents included in the block B[n] of the mainchain are shown in Table 3.

TABLE 3

| Symbol | Contents |
|---|---|
| $h^{[n-1]}$ | Hash value of previous block $B^{[n-1]}$ |
| $a^{[n]}$ | Bit string added by a sidechain |

TABLE 3-continued

| Symbol | Contents |
| --- | --- |
| n | Number of a block |
| P | A junction of timestamping request bit strings |
| *h[n] | Hash pointer of a block B[n] |

In Equation 9, the coefficient M determines a degree of difficulty of the hash puzzle. As the coefficient has a greater value, it becomes more difficult to calculate a nonce value that satisfies a corresponding hash puzzle. A miner (this indicates a node participating in the POW) that has first calculated the answers $r^{[n]}$, $h^{[n]}$ of the proof of work (POW) in the rotation $Rd^{[n]}$ announces the block $B^{[n]}$, and extends a mainchain $BC^{[n-1]}$ like $BC^{[n]}$ (Equation 11) owned by the miner by connecting the block $B^{[n]}$ to the mainchain $BC^{[n-1]}$.

$$BC^{[n]} = BC^{[n-1]} \| B^{[n]} \qquad (11)$$

Other participants of the mainchain network verify the announced block $B^{[n]}$ and add the block to their mainchains as an agreement therefor.

Accountchain

In an embodiment of the present invention, an accountchain includes information necessary to manage a license for smart-propertized digital content. The accountchain may be configured in a blockchain form having various forms. In the present embodiment, as an embodiment, the accountchain is described based on the blockchain model using the POW method used in Bit Coin. It is evident that the technology of the present disclosure may also be applied to other forms of proof methods (e.g., the POS) in view of contents.

A block $B^{*[k]}$ mined in an accountchain (indicated as $BC^{*[k-1]}$) when a k-rotation (this rotation is different from the rotation of the mainchain) of an accountchain starts is configured with a hash value $h^{*[k-1]}$ of a previous block $B^{*[k-1]}$, accounts $A_1^{[k]}, \ldots, A_{c|k|}^{[k]}$ (wherein c|k| means the number of accounts to be included in the block $B^{*[k]}$) generated in a current rotation, the pointer of a hash value $h^{*[k]}$ of a current block (i.e., the start location of a next block $B^{*[k+1]}$ in the accountchain), and a nonce value $r^{*[k]}$ used to calculate the hash value.

Information necessary to manage a piece of smart-propertized digital content is recorded on one account. It is assumed that the account $A_j^{[k]}$ (i.e., a j-th account registered with a k-th block of the accountchain) is an account in which the smart-propertized digital content s is managed the owner of s is the producer P (i.e., the owner of the account $A_j^{[k]}$ is the producer P).

Information recorded on the account $A_j^{[k]}$ is shown in Table 4.

TABLE 4

| Symbol | Contents |
| --- | --- |
| $id_s$ | Identification number of s |
| $C_s$ | Use condition on s |
| $pk_{MP}$ | Registration key (public key) of MP. Refer to Table 2 |
| pk | Public key for confirming electronic signature of P |
| w | Target value, $w = H_\lambda(id_s \| C_s \| pk_{MP} \| pk \| q \| H(Z_s))$ |
| q | Input value, 0 bit string having a length of 512 when an account is generated |
| $Z_s$ | License set for s, a null set when an account is generated |

In Table 4, $id_s$ is the identification number of s and notifies that the account $A_j^{[k]}$ has been generated to manage a license for which smart-propertized digital content s. In Table 4, $C_s$ represents a user condition on s, and is written by the owner P. pk is a public key of the owner P and used to verity electronic signature of P.

In Table 4, $Z_s$ is a "license" set for s. In this case, the license is configured with a registration key permitted to use s and information by which the validity of permission can be proved. In an embodiment of the present invention, the validity of permission means that the entire process of corresponding permission is verified by blockchain network participants and is registered with a blockchain.

When the account $A_j^{[k]}$ is generated, $Z_s$ is a null set, and an input value q is a 0 bit string having a length of 512. In this case, a target value w is defined like Equation 12.

$$w = H_\lambda(id_s \| C_s \| pk_{MP} \| pk \| q \| H(Z_s)), \ (1 \leq \lambda \leq 256) \qquad (12)$$

That after a hash value of is, $id_s \| C_s \| pk_{MP} \| pk \| q \| H(Z_s)$ is calculated, the target value w is defined as a result of a cut hash function HA that takes only the first A bit string.

An object of the input value q is to fix the target value w so that the target value can be calculated using the method of Equation 12 by changing the input value q in accordance with a change of a set $Z_s$ of the right of using s. In this case, as A becomes greater, it becomes more difficult to find out the input value q suitable for the target value w.

It has been assumed that the accounts $A_1^{[k]}, \ldots, A_{c|k|}^{[k]}$ are recorded on the block $B^{*[k]}$ of the accountchain. The account $A_j^{[k]}$ participates in the POW of the hash value $h^{*[k]}$ of the block $B^{*[k]}$ like Equation 13.

Proof of work (POW)-accountchain  (13)

A nonce value $r^*$ satisfying $H(h^{*[k-1]} \| u_1^{[k]} \| \ldots \| u_{c|k|}^{[k]} \| r^*) \in Y_M^* (1 \leq M^* \leq 256)$ is calculated with respect to given $h^{*[k-1]}, u_1^{[k]}, \ldots, u_{c|k|}^{[k]}$.

In Equation 13, $u_j^{[k]}$ is the same as Equation 14.

$$u_j^{[k]} = id_s \| C_s \| pk_{MP} \| pk \| w \ (A_j^{[k]} \text{ is the account of } s) \qquad (14)$$

In Equation 13, a result of the nonce value $r^{*[k]}$ satisfying the hash puzzle is the same as Equation 15, and is a hash value of the block $B^{*[k]}$ of the accountchain.

$$h^{*[k]} = H(h^{*[k-1]} \| u_1^{[k]} \| \ldots \| u_{c|k|}^{[k]} \| r^{*[k]}) \qquad (15)$$

As in the mainchain, in Equation 13, the coefficient $M^*$ determines a degree of difficulty of the hash puzzle. As the coefficient has a greater value, it becomes more difficult to calculate a nonce value that satisfies a corresponding hash puzzle.

In Table 4, it has been said that $id_s$, $C_s$, $pk_{MP}$, pk, and w cannot be modified. The reason for this is that as may be seen from Equation 15, the corresponding values directly influence the calculation of a hash value of an accountchain block.

In the k-rotation of the accountchain, a miner that has first calculated the answer $r^{*[k]}$, $h^{*[k]}$ of the POW announces the block $B^{*[k]}$ and extends its own accountchain like Equation 16 by connecting the block $B^{*[k]}$ to the accountchain $BC^{*[k-1]}$.

$$BC^{*[k]} = BC^{*[k-1]} \| B^{*[k]} \qquad (16)$$

Other participants of the accountchain network verify the announced block $B^{*[k]}$, and extend the announced block $B^{*[k]}$ by adding the announced block $B^{*[k]}$ to their account chains based on a corresponding agreement.

Sidechain

In an embodiment of the present disclosure, a process of generating, transferring and discarding a license for smart-propertized digital content is registered with multiple sidechains (one of the sidechains will be indicated as an SG-sidechain).

A process of generating, transferring or discarding a license for each of pieces of smart-propertized digital content may be registered with only one predetermined sidechain according to a predetermined rule. In this case, in the sidechain with which the process of generating a license for a piece of smart-propertized digital content is registered, a process of transferring or discarding the license for the corresponding content is also registered.

The sidechain is composed of segments each having the start and the end connected to a mainchain. The start and end of each of the segments is determined by the block hash value $h^{[n]}$ of the mainchain. Specifically, the first segment of the $S_\sigma$-sidechain is indicated as $S_\sigma^{[n_1]}$. $S_\sigma^{[n_1]}$ means a collection of blocks mined in the $S_\sigma$-sidechain during a corresponding period, assuming a case where the block hash value $h^{[n]}$ of the mainchain satisfies a predetermined specific condition is $n_2$ after satisfying the specific condition in $n_1$. Likewise, a $\tau$-th segment indicated as $S_\sigma^{[n_\tau]}$ means a collection of blocks sequentially mined in the $S_\sigma$-sidechain during a corresponding period, assuming a case where the block hash value $h^{[n]}$ of the mainchain satisfies a specific condition is $n=n_{\tau+1}$ after satisfying the specific condition in $n=n_\tau$.

One block of the mainchain may notify the start and end of a sidechain segment. If such a segment starts (a block to which any one sidechain segment is not connected may be present in the mainchain), only one segment is present. Although the segment of the sidechain is ended, the same rule is applied.

In the mainchain, when the hash value $h^{[n_\tau]}$ notifying the state of the $\tau$-th segment $S_\sigma^{[n_\tau]}$ of the $S_\sigma$-sidechain is announced, the miners of the $S_\sigma$-sidechain network verify a process of generating, transferring or discarding a license predetermined to be handled in the $S_\sigma$-sidechain, includes the processes whose verification is successful in the block $b_\sigma^{[n_\tau,i]}$ of the $S_\sigma$-sidechain, and challenge to mine a corresponding block. In this case, $b_\sigma^{[n_\tau,i]}$ is shown in Equation 17, and $h_\sigma^{[n_\tau,i]}$ is defined like Equation 18.

$b_\sigma^{[n_\tau,i]}=i$-th block of $\tau$-th segment $S_\sigma^{[n_\tau]}$ of $S_\sigma$-sidechain. (17)

$h_\sigma^{[n_\tau,i]}=$Hash value of $b_\sigma^{[n_\tau,i]}$ (18)

In Equation 18, a detailed method of calculating the hash value is shown in Equations 32 and 33.

When a request to be registered with the T-th segment $S_\sigma^{[n_\tau]}$ of the $S_\sigma$-sidechain is selected, requests for generating, transferring or discarding a license for smart-propertized digital content, for which a request for generating, transferring or discarding the license has occurred in a previous segment $S_\sigma^{[n_{\tau-1}]}$, are excluded. The reason for this is that contents requested in the previous segment $S_\sigma^{[n_{\tau-1}]}$ have not yet been incorporated. In order to effectively maintain such contents, each of the pieces of smart-propertized digital content allows a license to be changed only one even-numbered or odd-numbered segment of a specific sidechain according to a predetermined rule.

In an embodiment of the present invention, each sidechain is present as a dual. That is, when the hash value $h^{[n_\tau]}$ notifying that the $\tau$-th segment $S_\sigma^{[n_\tau]}$ of the SG-sidechain starts in the mainchain is announced, the miners of a dual $\hat{S}_\sigma$-sidechain network verify a process of generating, transferring or discarding a predetermined right of use to be handled in the $\hat{S}_\sigma$-sidechain, include the processes whose verification is successful in the block $\hat{b}_\sigma^{[\tau,i]}$ in the $\hat{S}_\sigma$-sidechain, and challenge to mine a corresponding block. In this case, $\hat{b}_\sigma^{[n_\tau,i]}$ is the same as Equation 19, and $\hat{h}_\sigma^{[n_\tau,i]}$ is defined like Equation 20.

$\hat{b}_\sigma^{[n_\tau,i]}=i$-th block of $\tau$-th segment $\hat{S}_\sigma^{[n_\tau]}$ of $\hat{S}_\sigma$-sidechain (19)

$\hat{h}_\sigma^{[\tau,i]}=$Hash value of $\hat{b}_\sigma^{[n_\tau,i]}$ (20)

In Equation 20, a detailed method of calculating the hash value is shown in Equations 35 and 36.

In the $\tau$-th dual segment $\hat{S}_\sigma^{[n_\tau]}$ of the dual $\hat{S}_\sigma$-sidechain, a modification command in which requests for generating, transferring or discarding the license in the previous segment $\hat{S}_\sigma^{[n_{\tau-1}]}$ are arranged based on smart-propertized digital contents are registered.

The blocks of the $\tau$-th segment $S_\sigma^{[\tau]}$ of the $S_\sigma$-sidechain connected to the mainchain and the $\tau$-th segment $\hat{S}_\sigma^{[\tau]}$ of the dual $\hat{S}_\sigma$-sidechain are the same as Equations 21 and 22.

$S_\sigma^{[\tau]}=[b_\sigma^{[n_\tau,0]},b_\sigma^{[n_\tau,1]},\ldots,b_\sigma^{[n_\tau,L-1]},b_\sigma^{[n_\tau,L]}]$ (21)

$\hat{S}_\sigma^{[\tau]}=[\hat{b}_\sigma^{[n_\tau,0]},\hat{b}_\sigma^{[n_\tau,1]},\ldots,\hat{b}_\sigma^{[n_\tau,\hat{L}-1]},\hat{b}_\sigma^{[n_\tau,\hat{L}]}]$ (22)

wherein the first blocks $b_\sigma^{[n_\tau,L]}$ and $\hat{b}_\sigma^{[n_\tau,\hat{L}]}$ of the two sidechains are a block $B^{[n_\tau]}$ of the start connection point of the mainchain, that is, Equation 23.

$b_\sigma^{[n_\tau,0]}=\hat{b}_\sigma^{[n_\tau,0]}=B^{[n_\tau]},h_\sigma^{[n_\tau,0]}=\hat{h}_\sigma^{[n_\tau,0]}=h^{[n_\tau]}$ (23)

The last blocks $b_\sigma^{[n_\tau,L]}$ and $\hat{b}_\sigma^{[n_\tau,\hat{L}]}$ are connected to the block $B^{[n_{\tau+1}]}$ of the mainchain. In this case, in order to connect the segments of the two sidechains to the mainchain, $h_\sigma^{[n_\tau,L]}\|\hat{h}_\sigma^{[n_\tau,\hat{L}]}$ are recorded on $a^{[n_{\tau+1}]}$ of the block $B^{[n_{\tau+1}]}$ of the mainchain. That is, $a^{[n_{\tau+1}]}$ is the same as Equation 24.

$a^{[n_{\tau+1}]}=h_\sigma^{[n_\tau,L]}\|\hat{h}_\sigma^{[n_\tau,\hat{L}]}$ or 512 zero bits (24)

In Equation 24, a case where $a^{[n_{\tau+1}]}$ becomes 512 zero bits is a case where a sidechain segment terminated in the block $B^{[n_{\tau+1}]}$ is not present.

Figure 4:
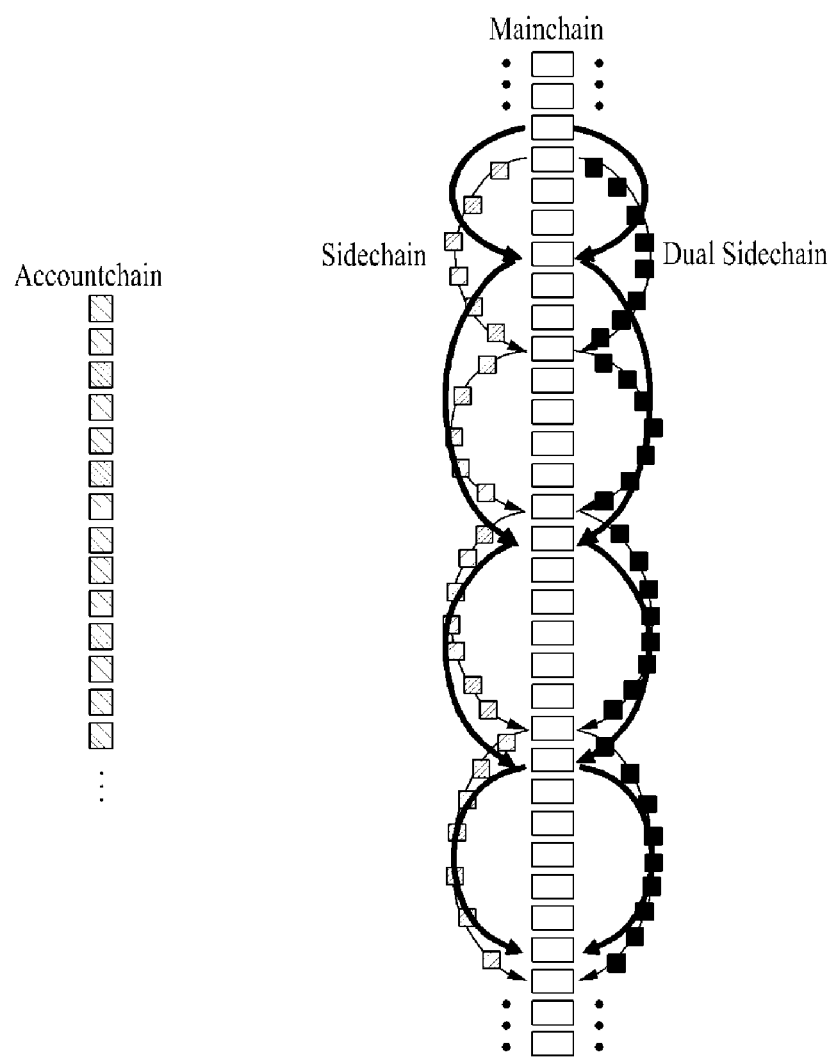
FIG. 4 illustrates a multi-blockchain structure according to an embodiment of the present disclosure.

FIG. 4 is a diagram illustrating a multi-blockchain structure proposed in an embodiment of the present invention.

Referring to FIG. 4, the multi-blockchain structure is configured with a mainchain, an accountchain, and multiple sidechains. Each of the sidechains forms a pair with a dual sidechain. Thick arrows connected to the mainchain represent another sidechain-dual sidechain pair in a form not including blocks.

Generation, Transferral or Discard of a License for Smart-Propertized Digital Content A process of changing (e.g., generating, transferring or discarding) a license for smart-propertized digital content s is described. To this end, a situation, such as Table 5, is assumed.

TABLE 5

| | |
|---|---|
| s | Smart propertized digital content |
| P | Owner of s |
| U | User who has purchased a license from P |
| V | User who tries to have a license for s transferred from U |
| pk | Public key of P by which electronic signature of P can be identified |
| $pk_U$ | Registration key used when U purchases the license for s |
| $pk_V$ | Registration key used when V has the license for s transferred |
| $L_{s, pk, pku}$ | License for s assigned to $pk_U$ by P |
| $L_{s}^{pkU, pkV}$ | License for s transferred from $pk_U$ to $pk_V$ |
| $A_j^{[k]}$ | Account that manages the right of using s |
| w | Target value (Table 4, Equation 12) of the account $A_j^{[k]}$ |
| q | Input value (Table 4, Equation 12) of the account $A_j^{[k]}$ |
| $Z_s$ | License set for s |
| $S_\sigma$ | Sidechain with which a change request for the license for s is registered |
| $S_\sigma^{[n_\tau]}$ | Segment of the $S_\sigma$-sidechain |
| $b_\sigma^{[n_\tau,i]}$ | Block of the sidechain segment $S_\sigma^{[n_\tau]}$ |

In an embodiment of the present disclosure, the account $A_j^{[k]}$ is designed to be modified so that the user U stores s in his or her own device in order to purchase the license for s from the producer P and play back s and a license $L_{s,pk,pku}$ that permits the user U to use s is included in the license set $Z_s$ of s. Furthermore, information capable of proving that such a modification is legitimate is recorded on the sidechain.

To this end, in an embodiment of the present invention, a transaction t defined like Equation 25 is verified in the $S_o$-sidechain network and registered.

$$t = \Lambda_{s,P,pkU} \| DS_P \qquad (25)$$

wherein $\Lambda_{s,P,pkU}$: "P generates the license for s to $pk_U$", $DS_P$: electronic signature of P for $\Lambda_{s,P,pkU}$.

It is assumed that a block with which the transaction t is registered is $b_o^{[n_\tau,i]}$ and the block belongs to the segment $S_o^{[n_\tau]}$ of the $S_o$-sidechain. As described in the previous paragraph, to register the transaction t with the τ-th segment $S_o^{[n_\tau]}$ of the $S_o$-sidechain means that a change request for the license for the smart-propertized digital content s of the transaction t was not present in a previous segment $S_o^{[\tau-1]}$.

In Equation 25, "P generates the license for s to $pk_U$" means that P permits a user who used $pk_U$ as a registration key to play back s. $L_{s,pk,pku}$ may include a monetary transaction (e.g., the remittance of cryptocurrency) related to the transaction along with overall information necessary to enable the transaction.

In an embodiment of the present invention, the rights of the user U to play back s using the registration key $pk_U$ is guaranteed by including the "license for s generated for $pk_U$", defined as Equation 26, in the license set $Z_s$ for s. In this case, $id_s$ is the identification number of s (refer to Equation 8 and Table 4), and I is the same as Equation 27.

$$L_{s,pk,pku} = (id_s, pk, pk_U, \Lambda_{s,P,pkU}, DS_P, I) \qquad (26)$$

Location of the block $b_o^{[n_\tau,i]}$ on which $I=t$ has been recorded=$(\sigma, n_\tau, i)$ (27)

In an embodiment of the present disclosure, if $L_{s,pk,pku}$ of Equation 26 is included in the license set $Z_s$ for s, the user U may use s using the registration key $pk_U$.

In an embodiment of the present disclosure, users can freely trade a license for smart-propertized digital content without the intervention of a producer. In this specification, if the user U transfers the license for the smart-propertized digital content s to a user V, this means that the user V can freely play back s, but the user U can no longer play back s.

An embodiment of the present disclosure has a structure in which the license for s is generated in the registration key of a user not the user. Accordingly, if the license for s is transferred from the user U to the user V, this means that a license $L_{s,pk,pku}$ (refer to Equation 26) for s generated in the registration key $pk_U$ of the user U is removed from the license set $Z_s$ of an account $A_j^{[k]}$ and a license $L_{s,pkU,pkV}$ (refer to Equation 29) for s assigned to the registration key $pk_V$ of the user V is instead included.

In an embodiment of the present invention, in order for the user U to transfer, to the registration key $pk_V$ of the user V, the license $L_{s,pk,pku}$ for s generated in his or her registration key $pk_U$, the user U verifies and registers a transaction t', defined as Equation 28, in the $S_o$-sidechain determined to handle the recording of a process of changing (e.g., generating, transferring or discarding) the license for s according to a predetermined rule.

$$t' = \Lambda_{s,U,pkV} \| DS_U \qquad (28)$$

wherein $\Lambda_{s,U,pkV}$: "U transfers the license for s to $pk_V$", $DS_U$: electronic signature of U for $\Lambda_{s,U,pkV}$.

It is assumed that a block with which the transaction t' is registered is $b_o^{[n_\tau,i]}$, and the block belongs to the segment $S_o^{[n_\tau]}$ of the $S_o$-sidechain.

In Equation 28, $\Lambda_{s,U,pkV}$ may include a monetary transaction (e.g., the remittance of cryptocurrency) related to transferral, along with overall information necessary to confirm that "U transfers the license for s to $pk_V$." Furthermore, in this process, the user V has to confirm whether the transferral of the license for s has been permitted by the producer P by checking the use condition $C_s$ on s in the account $A_j^{[k]}$ of s. It is hereinafter assumed that the producer P has set the license for s so that the license can be transferred.

In an embodiment of the present invention, to transfer, by the user U, the right of playing back s using the registration key $pk_U$ to the registration key $pk_V$ of the user V is guaranteed by including, in the license set $Z_s$ for s, the "license for s assigned to $pk_V$" defined as Equation 29.

$$L_{s,pkU,pkV} = (id_s, pk_U, pk_V, \Lambda_{s,U,pkV}, DS_U, I') \qquad (29)$$

wherein $id_s$ is the identification number of s (refer to Equation 8 and Table 4), and I' is the same as Equation 30.

Location of the block $b_o^{[n_\tau,i]}$ on which $I'=t'$ has been recorded=$(\sigma, n_\tau, i)$ (30)

In an embodiment of the present invention, the generation, transferral and discard of a license are not distinguished. All of the generation, transferral and discard correspond to a change of the license, and are processed under the same principle.

An embodiment of the present disclosure provides a method of preventing cheating so that a producer discards a license for smart-propertized digital content, owned by the producer, with respect to a behavior to illegally use the license.

As an example of a behavior to illegally use a license, the following situation is considered. It is assumed that the user U purchases the license $L_{s,pk,pku}$ for the smart-propertized digital content s from the owner P of s using the registration key $pk_U$ and then make public, to unspecified individuals, the private key $sk_U$ of the user U that forms a pair with the registration key $pk_U$, and multiple users use the private key $sk_U$ free of charge. In such a case, a user who is aware of the private key $sk_U$ of the user U can use a balance assigned to the registration key $pk_U$.

In an embodiment of the present invention, the use of the balance assigned to the registration key $pk_U$ is considered to be the illegal use of all of pieces of smart-propertized digital content purchased using $pk_U$. Accordingly, intellectual property rights of producers are protected in a way to discard a license generated in the registration key $pk_U$ of corresponding smart-propertized digital content. Furthermore, in an embodiment of the present invention, a system for recommending the detection of an illegal use by providing a compensation for a report on the use of a balance is constructed.

A method of discarding the license $L_{s,pk,pku}$ for the smart-propertized digital content s generated in the registration key $pk_U$ of the user U is the same as process of generating a license. For example, in Equation 25, instead of the transaction t containing contents indicating that "P generates the license for s in $pk_U$".

Equation 31 and a defined transaction t* are verified and registered in the $S_o$-sidechain predetermined to handle the recording of a process of changing (e.g., generating, transferring or discarding) the license for s.

$$t^* = \Lambda^*_{s,P,pkU} \| DS^*_P \qquad (31)$$

wherein $\Lambda^*_{s,P,pkU}$: "P discards the license for s generated in $pk_U$", $DS^*_P$: electronic signature of P for $\Lambda^*_{s,P,pkU}$.

The description given so far relates to a method of discarding an illegally used license if the user U receives the license for s generated by the producer P through the registration key $pk_U$. If a license is transferred from another person to the user U through the registration key $pk_U$, an illegally used license can be discarded using the method described so far.

A process of registering, with the block $b_o^{[n_\tau,i]}$ ($i \geq 1$), the transactions $t_1^{[i]}, \ldots, t_N^{[i]}$ related to the generation, transferral or discard of the license for s as in Equations 25, 28, and 31, that is, a process of mining the block $b_o^{[n_\tau,i]}$, is described. In this case, it is to be noted that multiple transactions may be registered with one block. Furthermore, it is to be noted that one of the transactions $t_1^{[i]}, \ldots, t_N^{[i]}$ may become the transaction t in Equation 25, the transaction t' in Equation 28, or the transaction t* in Equation 31.

Proof of work (POW)-sidechain (license generation, transferral or discard) (32)

A nonce value r satisfying $H(h_o^{[n_\tau,i-1]} \| t_1^{[i]} \| \ldots \| t_N^{[i]} \| r) \in Y_{OMO}$ ($1 \leq M0 \leq 256$) is calculated with respect to given $h_o^{[n_\tau,i-1]}, t_1^{[i]}, \ldots, t_N^{[i]}$.

In Equation 32, $h_o^{[n_\tau,i-1]}$ is a hash value of a block $b_o^{[n_\tau,i-1]}$ right before a block $b_o^{[n_\tau,i]}$ to be now mined. In Equation 28, the coefficient M0 determines a degree of difficulty of the hash puzzle. As the coefficient has a greater value, it becomes more difficult to calculate a nonce value that satisfies a corresponding hash puzzle.

Miners who perform Equation 32 check whether a redundant change request is present in the transactions $t_1^{[i]}, \ldots, t_N^{[i]}$, within a block to be now minted and removes the redundant change request, prior to the progress of Equation 32. Furthermore, the miners exclude a transaction already registered with blocks within the sidechain segment $S_o^{[n_\tau]}$ to which the block $b_o^{[n_\tau,i]}$ to be now mined is connected and which will be extended, among the transactions $t_1^{[i]}, \ldots, t_N^{[i]}$.

A result (Equation 33) of the nonce value $r_o^{[n_\tau,i]}$ satisfying the hash puzzle of Equation 32 is a hash value of the block $b_o^{[n_\tau,i]}$.

$$h_o^{[n_\tau,i]} = H(h_o^{[n_\tau,i-1]} \| t_1^{[i]} \| \ldots \| t_N^{[i]} \| r_o^{[n_\tau,i]})$$  (33)

The miner of the $S_o$-sidechain network who has first calculated the answers $r_o^{[n_\tau,i]}, h_o^{[n_\tau,i]}$ of the hash puzzle of the $S_o$-sidechain announces the block $b_o^{[n_\tau,i]}$ and extends the block $b_o^{[n_\tau,i]}$ by connecting the block $b_o^{[n_\tau,i]}$ to the sidechain segment. Participants of another $S_o$-sidechain network verify the announced block $b_o^{[n_\tau,i]}$ and extend the announced block $b_o^{[n_\tau,i]}$ by connecting the announced block $b_o^{[n_\tau,i]}$ to their sidechain segments according to an agreement.

A role of the dual $\hat{S}_o$-sidechain is described below. In order for a transaction (t in Equation 25, t' in Equation 28 or t* in Equation 31) to have a practical effect registered with the block $b_o^{[n_\tau,i]}$, the account $A_j^{[k]}$ of s needs to be modified by incorporating transactions for which the license set $Z_s$ for s has been requested. Timing at which a "modification command" MC performing the modification is actually applied, when a next dual segment $\hat{S}_o^{[n_\tau+1]}$ is connected to the mainchain after the block $b_o^{[n_\tau,i]}$ is announced and the sidechain segment $S_o^{[n_\tau]}$ is connected to the mainchain.

This is specifically described below. When the sidechain segment $S_o^{[n_\tau]}$ including the block $b_o^{[n_\tau,i]}$ with which the transaction (t in Equation 25, t' in Equation 28 or t* in Equation 31) is registered is connected to the block $B^{[n_\tau+1]}$ of the mainchain, a new segment $S_o^{[n_\tau+1]}$ and a dual segment $\hat{S}_o^{[n_\tau+1]}$ are started in the block $B^{[n_\tau+1]}$ of the mainchain at the same time.

Blocks to be included in the dual segment $\hat{S}_o^{[n_\tau+1]}$ handle only a piece of smart-propertized digital content per block. First, the participants of the dual $\hat{S}_o$-sidechain network re-arrange transactions, registered with the segment $S_o^{[n_\tau]}$ in a previous step, based on the smart-propertized digital content.

Block mining in the dual $\hat{S}_o$-sidechain is described below by describing a process of registering, with the block $\hat{b}_o^{[n_\tau+1,i]}$, the modification command MC for performing a request to change the license for the smart-propertized digital content s.

It is assumed that at least one transaction that requests a change in the license for s is present in the segment $S_o^{[n_\tau]}$ in a previous step. If the license set $Z_s$ for s has to be modified into $_s$ in order to perform such a request, a command that performs such modification is assumed to be MC:

$$MC = \text{update } Z_s \text{ to } _s \text{ in } A_j^{[k]}$$  (34)

In this case, specifically, MC adds $L_{s,pk,pku}$ to the license set for s in response to a generation request, such as the transaction t in Equation 25, adds $L_{s,pkU,pkV}$ to the license set for s while removing $L_{s,pk,pku}$ from the license set for s in response to a transferral request, such as the transaction t' in Equation 28, and removes $L_{s,pk,pku}$ from the license set for s in response to a discard request, such as the transaction t* in Equation 31.

In order for a participant of the dual $\hat{S}_o$-sidechain network to register MC in Equation 34 with the block $\hat{b}_o^{[n_\tau+1,i]}$ (i.e., in order to mine the block $\hat{b}_o^{[n_\tau+1,i]}$), the participant needs to solve the POW problem of Equation 35.

Calculate a nonce value $r$ satisfying
$H(id_S \| C_S \| pk_{MP} \| pk \| \hat{h}_o^{[n_\tau+1,i-1]} \| r \| H(_s)) \in Y_w$ with respect to given $\hat{h}_o^{[n_\tau+1,i-1]}, H(_s)$.  (35)

wherein $\hat{h}_o^{[n_\tau+1,i-1]}$ is a hash value of a previous block $\hat{b}_o^{[n_\tau+1,i-1]}$, and w is a target value of the account $A_j^{[k]}$ of s defined in Equation 12.

A result (Equation 36) of a nonce value $\hat{r}_o^{[n_\tau+1,i]}$ satisfying the hash puzzle of Equation 35 is a hash value of the block $\hat{b}_o^{[n_\tau+1,i]}$.

$$\hat{h}_o^{[n_\tau+1,i]} = H(id_S \| C_S \| pk_{MP} \| pk \| \hat{h}_o^{[n_\tau+1,i-1]} \| \hat{r}_o^{[n_\tau+1,i]} \| H(_s))$$  (36)

Information recorded on the block $\hat{b}_o^{[n_\tau+1,i]}$ is shown in Table 6.

TABLE 6

| Symbol | Contents |
| --- | --- |
| $h_o^{[n_\tau+1, i-1]}$ | Hash value of the previous block $b_o^{[n_\tau+1, i-1]}$ |
| $r_o^{[n_\tau+1, i]}$ | Nonce value of the current block $b_o^{[n_\tau+1, i]}$ |
| $*h_o^{[n_\tau+1, i]}$ | Hash pointer of the current block $b_o^{[n_\tau+1, i]}$ |
| ids | Identification number of s |
| $C_s$ | Use condition on s |
| $pk_{MP}$ | Registration key (public key) of MP. Refer to Table 2 |
| pk | Public key for confirming electronic signature of P |
| $Z_s$ | License set for updated s |

The miner of the dual $\hat{S}_o$-sidechain network who has first calculated the answer $\hat{r}_o^{[n_\tau+1,i]}, \hat{h}_o^{[n_\tau+1,i]}$ of the hash puzzle (Equation 35) of the dual $\hat{S}_o$-sidechain announces the block $\hat{b}_o^{[n_\tau+1,i]}$ and extends the block $\hat{b}_o^{[n_\tau+1,i]}$ by connecting the block $\hat{b}_o^{[n_\tau+1,i]}$ to the dual sidechain segment $\hat{S}_o^{[n_\tau+1]}$. Other participants of the dual $\hat{S}_o$-sidechain verify the announced block $\hat{b}_o^{[n_\tau+1,i]}$ and extend the block $\hat{b}_o^{[n_\tau+1,i]}$ by connecting the block $\hat{b}_o^{[n_\tau+1,i]}$ to their dual sidechain segments according to an agreement.

Timing at which a modification command MC registered with the block $\hat{b}_o^{[n_{\tau+1},i]}$ is actually applied to the account $A_j[k]$ is the time when the dual sidechain segment $\hat{S}_o^{[n_{\tau+1}]}$ included in the block $\hat{b}_o^{[n_{\tau+1},i]}$ is connected to the block $B^{[n_{\tau+2}]}$ of the mainchain. In this case, Equation 37 may be obtained by updating the license set for s of the account $A_j^{[k]}$ from $Z_s$ to $_s$ in response to the modification command MC of Equation 34 and replacing the input value q with $\hat{h}_o^{[n_{\tau+1},i-1]} \| \hat{r}_o^{[n_{\tau+1},i]}$. Accordingly, the license set $Z_s$ for s can be updated while a target value w of the account $A_j[k]$ is maintained.

$$w = H_\lambda(id_s \| C_s \| pk_{MP} \| pk \| q \| H(Z_s))$$

$$= H_\lambda(id_s \| C_s \| pk_{MP} \| pk \| \hat{h}_o^{[n_{\tau+1},i-1]} \| \hat{r}_o^{[n_{\tau+1},i]} \| H(_s)) \quad (37)$$

Furthermore, it is evident that such a modification based on Equations 14 and 15 does not degrade the integrity of a hash chain connection between blocks in an accountchain.

If a change based on the generation, transferral or discard of a license registered in the sidechain segment $S_o^{[n_\tau]}$ is not incorporated into the dual segment $\hat{S}_o^{[n_{\tau+1}]}$ in a next step, a registration procedure for the license change needs to be performed again because the change in the corresponding license has not been finally registered. In actual implementation, the probability that a case where a license change request registered in the sidechain segment $S_o^{[n_\tau]}$ is not incorporated into the dual segment $\hat{S}_o^{[n_{\tau+1}]}$ may occur become close to 0 by making λ in Equation 12, determining the degree of difficulty in Equation 35, smaller than M0 in Equation 32.

In an embodiment of the present invention, a collision does not occur in a process of updating a license because the generation, transferral or discard of the license for a piece of smart-propertized digital content is performed only in one pair of sidechains and a dual sidechain thereof.

Furthermore, in an embodiment of the present invention, in order to directly apply the generation, transferral or discard of a new license, new licenses are arranged for each account without modifying an account. Accordingly, a collision does not occur in a process of updating the licenses using a method of modifying the accounts at a time.

Figure 5:
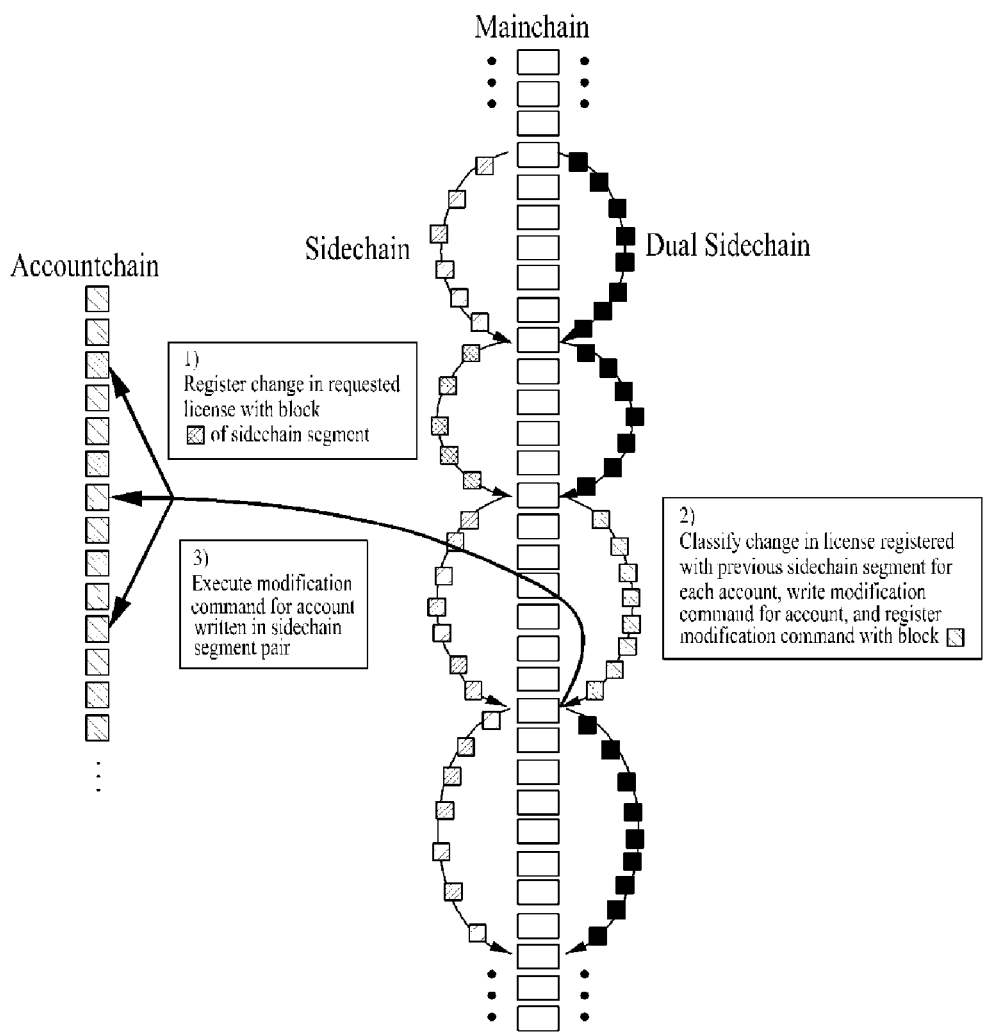
FIG. 5 is a diagram illustrating a process of modifying an account in response to a change in the license according to an embodiment of the present disclosure.

FIG. 5 is a diagram illustrating a process of modifying an account based on the generation, transferral or discard of a license.

A process of modifying an account in response to a change in a license according to an embodiment of the present disclosure may include the steps of 1) registering a requested license change with a sidechain segment, 2) classifying a license change, registered with a sidechain segment right before the sidechain segment, for each account, writing a modification command for the account, and registering the modification command with a dual sidechain block, and 3) performing the modification command when a dual sidechain segment is connected to a mainchain.

Process of Playing Back Smart-Propertized Digital Content

Symbols of Table 7 are used for convenience of description.

TABLE 7

| | |
|---|---|
| BC | Entire multi-blockchain system |
| s | Smart propertized digital content |
| $A_j^{[k]}$ | Account in which the right of using s is managed |
| $Z_s$ | License set for s |
| U | User who has purchased a license $L_{s, pk, pku}$ for s |
| $pk_U$ | Registration key of a user U used to purchase $L_{s, pk, pku}$ |
| $sk_U$ | Authentication key of user U corresponding to $pk_U$ |

TABLE 7-continued

| | |
|---|---|
| V | User to which a license for $L_{s, pkU, pkV}$ has been transferred from U |
| $pk_V$ | Registration key of a user V used to transfer $L_{s, pkU, pkV}$ |
| $MP_U$ | Management program of the user U |
| $A_U$ | Account set of licenses for content owned by U |
| $pk_{MP}$ | Registration key of a management program MP |
| $pk_{MPU}$ | Registration key of $MP_U$ |
| $S_{MPU}$ | Result of addition of $pk_{MPU}$ to s by $MP_U$ |
| $MP_V$ | Management program of the user V |
| $A_V$ | Account set of licenses for content owned by V |
| $pk_{MPV}$ | Registration key of $MP_V$ |
| $S_{MPV}$ | Result of addition of $pk_{MPV}$ to s by $MP_V$ |

The management program $MP_U$ of the user U may be installed and used in a limited number of several devices, but is designed to be prevented from being used at the same time. Furthermore, $MP_U$ is designed so that external information is executed in an unreliable environment, but an internal execution process operates a planned procedure and method and $A_U$ (i.e., a set of accounts for smart-propertized digital content of licenses owned by the user U) stored therein can be accessed by only $MP_U$ and cannot be forged on the outside.

To design $A_U$ so that it can be accessed by only the management program $MP_U$ and cannot be forged on the outside is one of the aforementioned "agreed rules."

A process of performing, by the management program $MP_U$, the purchase of the license $L_{s,pk,pku}$ for the smart-propertized digital content s and then playing back s is described below.

In order for the user U to substantially exert the license $L_{s,pk,pku}$ for s after purchasing the license, the user needs to pass through all of the following steps A1, A2, and A3 of including the license $L_{s,pk,pku}$ in the license set $Z_s$ of an account $A_j^{[k]}$ for managing s:

A1) Register a generation request for $L_{s,pk,pku}$ in $pk_U$ in the sidechain segment $S_o^{[n\tau]}$ A2) Register a modification command for $A_j^{[k]}$ in the dual sidechain segment $\hat{S}_o^{[n\tau+1]}$ A3) Modify the account $A_j^{[k]}$: include $L_{s,pk,pku}$ in the license set $Z_s$ for s The steps A1, A2, and A3 are performed in the entire multi-blockchain system BC, and the management program $MP_U$ of the user U updates $A_U$ based on a result of the execution. This is assumed to be step A4:

A4) $MP_U$ updates $A_U$ using the BC

In an embodiment of the present disclosure, $MP_U$ starts search from a block of a mainchain at timing at which a license is purchased in step A4 (e.g., timing at which the license of Equation 25 is purchased and the transferral transaction of the license in Equation 28 is requested to be registered with a sidechain), checks whether the modification command of a block related to s in next blocks and dual sidechain segments connected to the blocks has been performed in the entire multi-blockchain system BC (i.e., check whether the account $A_j^{[k]}$ of s of a BC accountchain has been modified in response to the modification command of s of the dual sidechain block), includes the account $A_j^{[k]}$ of the accountchain in $A_U$, searches $A_U$ for $A_j^{[k]}$, and provides a retrieved $A_j^{[k]}$ to the IM.

To search, by the management program $MP_U$, the entire multi-blockchain system BC using the method described in the previous paragraph, update $A_U$, search $A_U$ for account information requested by the IM, and provide retrieved account information to the IM is one of the aforementioned "agreed rules."

If the user U purchases the license $L_{s,pkU,pkV}$ for s and then plays back s after waiting until all of steps A1, A2, A3, and A4 are passed, the user's inconvenience will be great. In an embodiment of the present invention, in order to solve the inconvenience of a user according to time delay, $MP_U$ previously downloads s and modifies s into $S_{MPU}$ in a form that may be managed by $MP_U$. This process may be completed even before the license $L_{s,pkU,pkV}$ is purchased.

The management program $MP_U$ requests the playback of s while providing the registration key $pk_U$ used to purchase the license $L_{s,pkU,pkV}$ for s to the immobilizer IM embedded in $s_{MPU}$. Accordingly, the IM performs steps B1, B2, B3, and B4 while immediately performing playback (i.e., perform the decoding of encoded content c, refer to Equation 8):

B1) IM: the start of time measurement

B2) IM↔$MP_U$: $MP_U$ authenticating using a challenge-response method for $pk_{MPU}$ B3) IM↔$MP_U$: MP authentication using a challenge-response method for $pk_{MP}$ B4) IM↔$MP_U$: Authenticate whether $sk_U$ is owned using a challenge-response method for $pk_U$ In step B1, the IM measures the time using the amount of data decoded by the IM without using external time information.

Step B2 is an $MP_U$ authentication process using a challenge-response method for confirming, by the IM, whether the management program $MP_U$ owns the authentication key $sk_{MPU}$ corresponding to the registration key $pk_{MPU}$ used when the management program $MP_U$ that has instructed the playback of s modifies s into $S_{MPU}$. In this process, the challenge is contents that need to be performed by the IM, and the response contents that need to be performed by $MP_U$. If step B2 is not completed until a predetermined time $x_0$ from the start of time measurement of the IM in step B1, the IM terminates the playback of s.

After passing through step B2, in step B3, the IM authenticates whether $MP_U$ that has instructed the playback of s is the management program MP through a challenge-response method for the registration key $pk_{MP}$ of a management program recorded on s. If step B3 is not completed until a predetermined time $x_1 (x_0 < x_1)$ from the start of time measurement of the IM in step B1, the IM terminates the playback of $s_{MPU}$.

After passing through step B3, in step B4, the IM authenticates whether the user U owns the authentication key $sk_U$ through a challenge-response method for the registration key $pk_U$ used when purchasing the license $L_{s,pk,pku}$ for s. If step B4 is not completed until a predetermined time $x_2 (x_1 < x_2)$ from the start of time measurement of the IM in step B1, the IM terminates the playback of s.

After passing through step B4, at a time $x_2$ based on the time measurement of the IM in step B1, in a next step C1, the IM requests the account $A_j^{[k]}$ of s from $MP_U$, and $MP_U$ provides corresponding information. In step C2, the IM verifies whether the license $L_{s,pk,pku}$ including the registration key $pk_U$ used for user authentication in step B4 is included in the license set $Z_s$ of the account $A_j^{[k]}$:

C1) IM↔$MP_U$: the account $A_j^{[k]}$ of s

C2) IM: Check $L_{s,pk,pku}$ in $Z_s$ of $A_j^{[k]}$

In step C1, $MP_U$ provides the account $A_j^{[k]}$ of s requested by the IM. If step C1 is not completed up to a time $x_3 (x_2 < x_3)$ based on the time measurement of the IM in step B1, the IM stops the playback of s. In this case, the playback of s is not terminated, but is in a stopped state.

If a failure occurs in step C1, the reason for this is that $A_j^{[k]}$ is not included in $A_U$ up to the predetermined time $x_3$. The reason for this is that since steps A1, A2, and A3 have not been completed, the license $L_{s,pk,pku}$ for s purchased by the user U has not yet been registered with the account $A_j^{[k]}$ of the BC or the license $L_{s,pk,pku}$ has been registered with the account $A_j^{[k]}$ of the BC, but $MP_U$ has not completed a process of updating $A_U$ using the BC in step A4. In order to reduce the probability that the first case will occur, high-speed block mining in the mainchain and the sidechain is applied, and the update speed of the entire multi-blockchain system BC for the generation of a license is increased through the parallelism of block mining into sidechains using multiple sidechains. In order to reduce the probability that the second case will occur, $MP_U$ regularly verifies the BC so that $A_U$ has a recent state, thereby reducing the time taken for step A4.

After passing through step C1, if step C2 is not completed up to a time $x_4 (x_3 < x_4)$ based on the time measurement of the IM in step B1, the IM terminates the playback of s. In determining the time $x_4$, the IM checks whether the license $L_{s,pk,pku}$ is included in the license set $Z_s$ of the account $A_j^{[k]}$ provided thereto. That is, in an embodiment of the present invention, if step C1 has been passed, but a failure occurs in step C2, this means that the license $L_{s,pk,pku}$ is not included in $Z_s$ of $A_j^{[k]}$ provided from $MP_U$ to the IM. It is to be noted that a situation in which a failure occurs in step C2 although step C1 has been passed does not occur in the state in which the user U does not transfer the license $L_{s,pk,pku}$ for s after purchasing the license under the condition.

If s is played back after the account $A_j^{[k]}$ of s is updated so that the license $L_{s,pk,pku}$ purchased by the U is included in $A_U$ of the management program $MP_U$, steps A1, A2, A3, and A4 are omitted, and a process is performed from step B1.

A case where the user U transfers the right of using the smart-propertized digital content s to the user V is described. First, it is assumed that the user U has forgiven the license $L_{s,pk,pku}$ for s generated in his or her registration key $pk_U$ and has transferred the license $L_{s,pkU,pkV}$ for s to the registration key $pk_V$ of the user V.

In an embodiment of the present invention, in order to solve user inconvenience attributable to time delay, the management program $MP_V$ of the user V is permitted to previously download s and to modify s into $S_{MPV}$ having a form that may be managed by the management program. This process may be completed before the license is transferred.

Steps performed when the management program $MP_V$ of the user V plays back s right after the transfer are the same as the steps performed by the management program $MP_U$ of the user U when playing back s after purchasing the license $L_{s,pk,pku}$ for s. That is, in steps A4, B1, B2, B3, B4, C1, and C2, processes performed by $MP_U$ using $A_U$ are performed by $MP_V$ using $A_V$ (a set of accounts of smart-propertized digital content of licenses owned by the user V). In tasks performed in steps A1, A2, and A3, the license $L_{s,pkU,pkV}$ is included in the license set $Z_s$ of the account $A_j^{[k]}$ of s, and a task for removal is performed on the license $L_{s,pk,pku}$.

In steps performed when the management program $MP_U$ of the user U plays back s right after the transfer, the management program $MP_U$ of the user U may also play back s because the account $A_j^{[k]}$ that manages s in $A_U$ still remains and the license $L_{s,pk,pku}$ is included in $Z_s$ of the corresponding account. However, after $A_U$ is updated and the account $A_j^{[k]}$ that manages s is removed, $MP_U$ no longer plays back s.

A case where the license $L_{s,pk,pku}$ for s generated in the registration key $pk_U$ of the user U is discarded by the owner P of s is described. The discard of the license $L_{s,pk,pku}$ of the owner P is completed when a command for removing the license $L_{s,pk,pku}$ from the license set $Z_s$ of the account $A_j^{[k]}$ that manages s is performed. That is, in steps A1, A2, and A3, a task for removing the license $L_{s,pk,pku}$ from the license set $Z_s$ of the account $A_j^{[k]}$ of s is performed.

If the authentication key $sk_U$ corresponding to the registration key $pk_U$ is illegally used, the discard of the license may be performed on all of pieces of smart-propertized digital content purchased or transferred using the registration key $pk_U$. That is, the owners of all of pieces of smart-propertized digital content related to a license generated or transferred in or to the registration key $pk_U$ may request the license related to the registration key $pk_U$ to be discarded from their accounts.

In an embodiment of the present disclosure, the management program $MP_U$ regularly or irregularly performs the following three types of $A_U$ updates:

U1) Update all accounts included in $A_U$ in an $N_0$-cycle

U2) Updates according to generation or transferral of a license for the content s U3) Updates the verification period of the mainchain in an $N_1$-cycle In the U1-update, the management program $MP_U$ checks (modify corresponding accounts of an accountchain) whether modification commands related to the registration key of the user U have been actually performed by searching the block of the mainchain, finally retrieved in the U1-update, for a maximum number of $N_0$ next blocks and dual sidechain segments connected to the next blocks, and then updates $A_U$ based on modified accounts.

In the U2-update, the management program $MP_U$ performs the task performed at step A4.

In the U3-update, the management program $MP_U$ searches a block (called $B^{[n_0]}$) of the mainchain, finally retrieved in the U3-update, for a maximum number of $N_1$ next blocks and dual sidechain segments related to the next blocks, and updates $A_U$ with accounts related to smart-propertized digital contents retrieved in the U2-update after the block $B^{[n_0]}$ of the mainchain is mined.

In the U1, U2, and U3 updates, $N_0 < N_1$ is set so that the U1-update is more frequently performed compared to the U3-update.

$A_U$ is accessible to only $MP_U$. $MP_U$ refers to only the entire multi-blockchain system BC in the update of $A_U$. That is, even the user U cannot randomly manipulate $A_U$.

A challenge is considered in which $A_U$ is to be updated based on a specific object by providing the management program $MP_U$ with the entire forged multi-blockchain system BC*. In order for this method to be successful, the integrity of BC* needs to be guaranteed. Furthermore, in order for $MP_U$ to be not continuously discovered in the U1-, U2-, U3-update, BC* continues to be expanded at the same speed as BC, but this is impossible without the help of all of network participants. Furthermore, in an embodiment of the present disclosure, $MP_U$ is designed to generate a random number in the U3-update and to verify and reject the up-to-date of BC* provided by requesting timestamping (refer to Equations 9 and 10, and Table 3) from the block of the mainchain.

To design the management program $MP_U$ so that it searches for the entire multi-blockchain system BC based on the U1-, U2-, and U3-update described in the previous paragraph and updates $A_U$ is one of the aforementioned "agreed rules."

Figure 6:
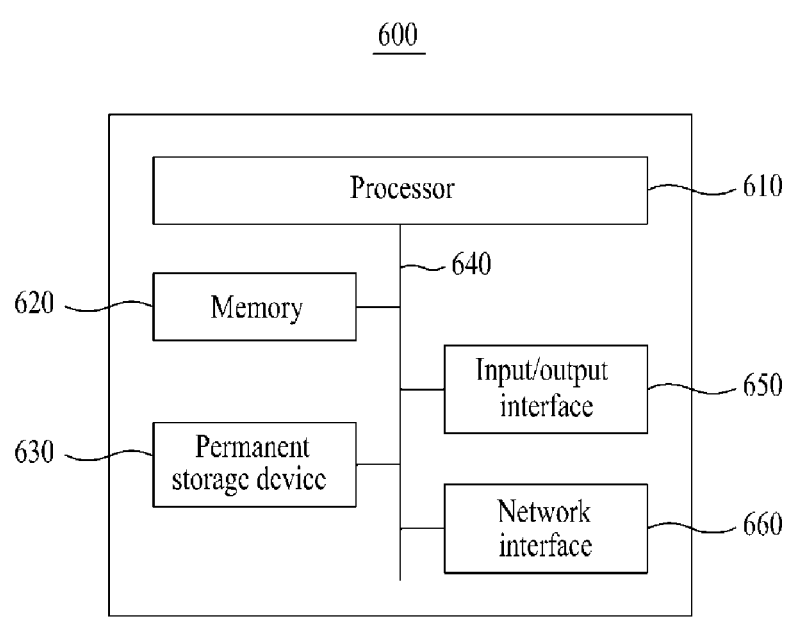
FIG. 6 is a block diagram for describing an example of internal elements of a computer system according to an embodiment of the present disclosure.

FIG. 6 is a block diagram for describing an example of internal elements of a computer system according to an embodiment of the present disclosure.

A system for protecting intellectual property rights on digital content according to embodiments of the present disclosure may be implemented through a computer system 600 of FIG. 6. As illustrated in FIG. 6, the computer system 600 may include a processor 610, a memory 620, a permanent storage device 630, a bus 640, an input/output interface 650 and a network interface 660 as components for executing the method of protecting intellectual property rights on digital content.

The processor 610 may include a given device capable of processing a sequence of instructions or may be part of the device. The processor 610 may include a computer processor, a mobile device or a processor and/or a digital processor within another electronic device, for example. The processor 610 may be included in a server computing device, a server computer, a series of server computers, a server farm, a cloud computer, a content platform, a mobile computing device, a smartphone, a tablet, and a set-top box, for example. The processor 610 may be connected to the memory 620 through the bus 640.

The memory 620 may include a volatile memory, a permanent, virtual or other memory for storing information output or used by the computer system 600. For example, the memory 620 may include a random access memory (RAM) and/or a dynamic RAM (DRAM). The memory 620 may be used to store given information, such as state information of the computer system 600. The memory 620 may also be used to store instructions of the computer system 600, including instructions for protecting intellectual property rights on digital content, for example. The computer system 600 may include one or more processors 610 if necessary or in a proper case.

The bus 640 may include a communication-based structure that enables an interaction between various components of the computer system 600. The bus 640 may carry data between the components of the computer system 600, for example, between the processor 610 and the memory 620. The bus 640 may include a wireless and/or wired communication medium between the components of the computer system 600, and may include parallel, serial or other topology arrays.

The permanent storage device 630 may include components, such as a memory such as that used by the computer system 600 or another permanent storage device, in order to store data for a given extended period (e.g., compared to the memory 620). The permanent storage device 630 may include a nonvolatile main memory, such as that used by the processor 610 within the computer system 600. For example, the permanent storage device 630 may include a flash memory, a hard disk, an optical disk or other computer-readable media.

The input/output interface 650 may include interfaces for a keyboard, a mouse, a microphone, a camera, a display or other input or output devices. Configuration instructions and/or an input related to the protection of intellectual property rights on digital content may be received through the input/output interface 650.

The network interface 660 may include one or more interfaces for networks, such as a short distance network or the Internet. The network interface 660 may include interfaces for wired or wireless connections. The configuration instructions may be received through the network interface 660. Furthermore, information related to the protection of intellectual property rights on digital content may be received or transmitted through the network interface 660.

Furthermore, in other embodiments, the computer system 600 may include more components than those of FIG. 6.

However, it is not necessary to clearly illustrate most of conventional components. For example, the computer system 600 may be implemented to include at least some of input and output devices connected to the input/output interface 650 or may further include other components, such as a transceiver, a global positioning system (GPS) module, a camera, various sensors, and a database.

As described above, according to embodiments of the present disclosure, as long as the entire multi-blockchain system BC is extended normally, intellectual property rights on smart-propertized digital content can be safely protected.

The aforementioned device may be implemented by a hardware component, a software component and/or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS.

Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiments may be implemented in the form of a program instruction executable by various computer means and stored in a computer-readable recording medium. In this case, the medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server.

A cost necessary for digital rights management can be significantly reduced because digital content producers are allowed to apply a technology capable of protecting intellectual property rights on their digital content.

Users can freely use purchased digital content under the least constraint condition.

Small-sized business operators can participate in a digital content distribution ecosystem dominated by a minority of large-sized intermediate sellers by constructing a digital content distribution ecosystem using a multi-blockchain having a public structure.

Furthermore, a profit distribution structure in the digital content industry can be reformed through the developed ecosystem, and the developed ecosystem can be applied to various business models and contribute to overall development of the content industry by inducing the development of digital content.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and equivalents of the claims fall within the scope of the claims.

What is claimed is:

1. A method of protecting intellectual property rights on digital content, the method being executed in a computer system and the computer system comprising:

at least one processor configured to execute computer-readable instructions included in a memory, the method is executed by the at least one processor, and comprises:

determining whether to decode encoded digital content based on digital data indicative of a license, recorded on a blockchain, for the encoded digital content, wherein the encoded digital content, a decoding function in which a secret key is hidden, and an immobilizer controlling the decoding are combined in an inseparable form of a smart-propertized digital content, and wherein determining whether to decode the encoded digital content comprises performing the decoding of the encoded digital content in response to the immobilizer, combined in the inseparable form of the smart-propertized digital content, successfully authenticating a management program for a particular user, the management program configured to access and use the encoded digital content according to agreed rules of use defined for the management program for the particular user;

controlling the license using a multi-blockchain structure comprising a mainchain for providing blockchain network participants with sequence information on contents registered with the blockchain, an accountchain comprising information necessary to manage the license, and multiple sidechains composed of segments whose starts and ends are connected to the mainchain, and registering a process of generating, transferring and discarding the license, wherein each of the mainchain and the sidechain has an unmodifiable structure and the accountchain has a modifiable structure, wherein a start and an end of each of the segments are determined by a block hash value of the mainchain, wherein the multiple sidechains include a first sidechain and a first dual sidechain paired with the first sidechain;

in response to a change in the license, registering a requested license change with a segment of the first sidechain;

classifying a previously registered license change, the previously registered license change having been registered with a previous segment of the first sidechain;

writing a modification command for an account, and registering the modification command with a segment of the first dual sidechain; and performing the modification command in response to the segment of the first dual sidechain being connected to the mainchain.

2. The method of claim 1, wherein controlling the license comprises disclosing a sequence relation between blocks of the sidechain and a task to be performed in each step to the blockchain network participants using the mainchain.

3. The method of claim 1, wherein controlling the license comprises: generating the account for managing the digital content, and applying a modifiable blockchain structure to the accountchain having a connection of blocks of accounts so that a generation, transferral or discard of the license is able to be registered with the generated account.

4. The method of claim 1, wherein controlling the license comprises: registering a request for generating, transferring or discarding the license with a segment of a dual sidechain in which the sidechains connected to the mainchain are present in pairs, and registering a modification command for modifying an account with a next dual sidechain in response to the request for generating, transferring or discarding the license.

5. The method of claim 1, further comprising using cryptocurrency as a transaction price for a generation or transferral of the license.

6. The method of claim 1, wherein determining whether to decode the encoded digital content comprises performing the decoding of the encoded digital content using the management program for managing a private key corresponding to a registration key used to manage the license.

7. The method of claim 1, further comprising generating multiple pieces of the encoded digital content from one piece of digital content using a randomly selected secret key.

8. The method of claim 1, further comprising protecting personal information related to a consumption of the digital content by assigning the license to a randomly selected registration key.

9. The method of claim 1, further comprising setting a period in which the digital content is used by modifying an account in which the license is managed.

10. The method of claim 1, further comprising: setting a user condition for the digital content by modifying an account in which the license is managed and determining a number of pieces of the digital content available based on the user condition.

11. The method of claim 1, further comprising discarding a license assigned to a registration key used for an illegal use of the license.

12. The method of claim 1, wherein the inseparable form of the smart-propertied digital content further comprises a public registration key for the management program for the particular user, and wherein performing the decoding of the encoded digital content in response to the immobilizer successfully authenticating the management program for the particular user comprises: authenticating the management program using the public registration key for the management program for the particular user, the public registration key included in the inseparable form of the smart-propertized digital content.

13. A computer system comprising:
at least one processor configured to execute computer-readable instructions included in a memory to perform operations including:
determining whether to decode encoded digital content based on digital data indicative of a license, recorded on a blockchain, for the encoded digital content, wherein the encoded digital content, a decoding function in which a secret key is hidden, and an immobilizer controlling the decoding are combined in an inseparable form of a smart-propertized digital content,
performs the decoding of the encoded digital content in response to the immobilizer, combined in the inseparable form of the smart-propertized digital content, successfully authenticating a management program for a particular user, the management program configured to access and use the encoded digital content according to agreed rules of use defined for the management program for the particular user;
controlling the license using a multi-blockchain structure, comprising a mainchain for providing blockchain network participants with sequence information on contents registered with the blockchain, an accountchain comprising information necessary to manage the license, and multiple sidechains composed of segments whose starts and ends are connected to the mainchain and registering a process of generating, transferring and discarding the license,
wherein each of the mainchain and the sidechain has an unmodifiable structure, and the accountchain has a modifiable structure,
wherein a start and an end of each of the segments are determined by a block hash value of the mainchain,
wherein the multiple sidechains include a first sidechain and a first dual sidechain paired with the first sidechain;
in response to a change in the license, registering a requested license change with a segment of the first sidechain;
classifying a previously registered license change, the previously registered license change having been registered with a previous segment of the first sidechain;
writing a modification command for an account, and registering the modification command with a segment of the first dual sidechain; and
performing the modification command in response to the segment of the first dual sidechain being connected to the mainchain.

* * * * *